United States Patent [19]
Qvarth

[11] Patent Number: 5,800,079
[45] Date of Patent: Sep. 1, 1998

[54] MILLING TOOL HAVING INSERT-CARRYING CARTRIDGES SECURED BY WEDGES

[75] Inventor: Ingemar Qvarth, Valbo, Sweden

[73] Assignee: Sandvik Aktiebolag, Sandviken, Sweden

[21] Appl. No.: 742,482

[22] Filed: Nov. 1, 1996

[30] Foreign Application Priority Data

Nov. 2, 1995 [SE] Sweden .................... 9503867

[51] Int. Cl.$^6$ .................. B23C 5/08; B23C 5/22
[52] U.S. Cl. ................. 407/46; 407/49; 407/47; 409/234; 144/230
[58] Field of Search ..................... 407/41, 43, 46, 407/47, 49; 409/234, 236, 241; 144/229, 230, 174

[56] References Cited

U.S. PATENT DOCUMENTS

| | | |
|---|---|---|
| 1,951,101 | 3/1934 | Miller .................... 407/49 |
| 4,801,224 | 1/1989 | Pettersson et al. . |
| 4,922,977 | 5/1990 | Colton et al. . |
| 5,395,186 | 3/1995 | Qvart . |
| 5,454,671 | 10/1995 | Qvarth . |

FOREIGN PATENT DOCUMENTS

| | | | |
|---|---|---|---|
| 610.027 | 5/1926 | France ................... 144/230 |
| 14888 | 10/1956 | Germany .................. 407/41 |
| 1 102 526 | 3/1961 | Germany . |
| 2904040 | 9/1979 | Germany ................ 144/230 |

Primary Examiner—A. L. Pitts
Assistant Examiner—Henry W. H. Tsai
Attorney, Agent, or Firm—Burns, Doane, Swecker & Mathis, L.L.P.

[57] ABSTRACT

A milling cutter tool includes a rotary body having recesses spaced along its outer body, each recess receiving an insert-carrying cartridge and a wedge for retaining the cartridge. Leading and trailing surfaces of each recess converge radially inwardly, whereas leading and trailing surfaces of each wedge converge radially outwardly. An actuator pushes each wedge radially outwardly into clamping relationship with the cartridge.

14 Claims, 6 Drawing Sheets

MILLING TOOL HAVING INSERT-CARRYING CARTRIDGES SECURED BY WEDGES

BACKGROUND OF THE INVENTION

The present invention relates to a milling tool, preferably in the form of a slot or a side and face milling cutter, with fastened, replaceable cutting inserts. The cutting inserts are carried by cartridges accommodated in recesses or grooves at the periphery of the milling cutter body. Each cartridge is arranged to be fixed in its recess by fastening means in the form of a clamping wedge.

Milling tools with cutting elements arranged in grooves in the milling cutter body are disclosed in, e.g., DE-B-1 102 526. In that case, the cutting units are fastened by screws and serrated wedges. It is true that this fastening makes possible a good stability and regrindability, but such a tool does not allow the obtaining of the desired precision when replacing the inserts and, moreover, the manufacturing becomes very costly. Further, this construction is not applicable to thinner disk-shaped milling tools, such as slotting milling tools.

Another milling cutter in the form of a side and face milling cutter is disclosed in Qvart U.S. Pat. No. 5,395,186. According to that construction, the insert-carrying cartridges are clamped in recesses around the periphery of the milling cutter body by means of substantially radially oriented clamping wedges. Each cartridge has a wedge-shaped portion, and a serration arranged axially in the recess on the trailing wall of each recess intended to cooperate with a corresponding serration on the cartridge. The clamping wedge tapers radially inwardly and is clamped by a locking screw, which is threaded through a through-hole in the clamping wedge and is tightened into a threaded hole in the disk per se. Although this tool has proved to provide precise adjustments and to form very smooth surfaces on the workpiece, it has a couple of drawbacks, which it would be desirable to eliminate. Thus, there is a small risk that a clamping wedge would become loose and be flung out with large force, which could have fatal consequences. Further, with this clamping construction it is difficult to reduce the cutting widths to below 10 mm, since the wedge with a hole necessitates a certain width.

It is true that narrower grooves may be manufactured with a slotting cutting miller that is constructed in accordance with Pettersson et al. U.S. Pat. No. 4,801,224. According to such construction, each cutting insert is clamped by the spring force that arises when bending a clamping arm formed in the disk. That arrangement is easy to use and very simple in construction, with extremely few included parts. However, the disadvantage is that it is not centrifugally secured to the desired degree. Moreover, the insert positions are exposed to a certain wear each time a new insert is clamped.

Furthermore, a rotary cutting head for exclusively woodworking is disclosed in Colton et al. U.S. Pat. No. 4,922,977. That tool has wedges tapering radially outwards for the clamping of cutting teeth, the latter having a serrated surface. Thus, both the wedge and the tooth are centrifugally secured. The recess for each cutting position is relatively deep and wide and it widens radially inwards, thus weakening the disk. This might be satisfactory for woodworking but not for metal machining, since the specific cutting forces in the latter case are many times larger. Besides, the art of woodworking is completely different from the art of metal machining.

Thus, a primary object of the present invention is to provide a side and face milling cutter for metal machining that permits narrow cutting widths with a strong and stable clamping of the cutting inserts.

A further object of the present invention is to construct a face and side milling cutter whose different included parts are absolutely resistant to dislodgement by centrifugal forces.

Another object of the present invention is to minimize the weakening of the disk by the provision of recesses therein for the cutting inserts.

SUMMARY OF THE INVENTION

These and further objects have been attained by providing a clamping wedge with leading and trailing surfaces that converge radially outwardly, and an actuator for pushing the wedge radially outwardly into clamping engagement with an insert-carrying cartridge. The recess in which the wedge and cartridge are disposed has leading and trailing walls which converge radially inwardly.

BRIEF DESCRIPTION OF THE DRAWING

For illustrative but non-limiting purposes, the invention will now be further described with reference to the appended drawings. These are herewith briefly presented.

DETAILED DESCRIPTION OF PREFERRED EMBODIMENTS OF THE INVENTION

Figure 1:
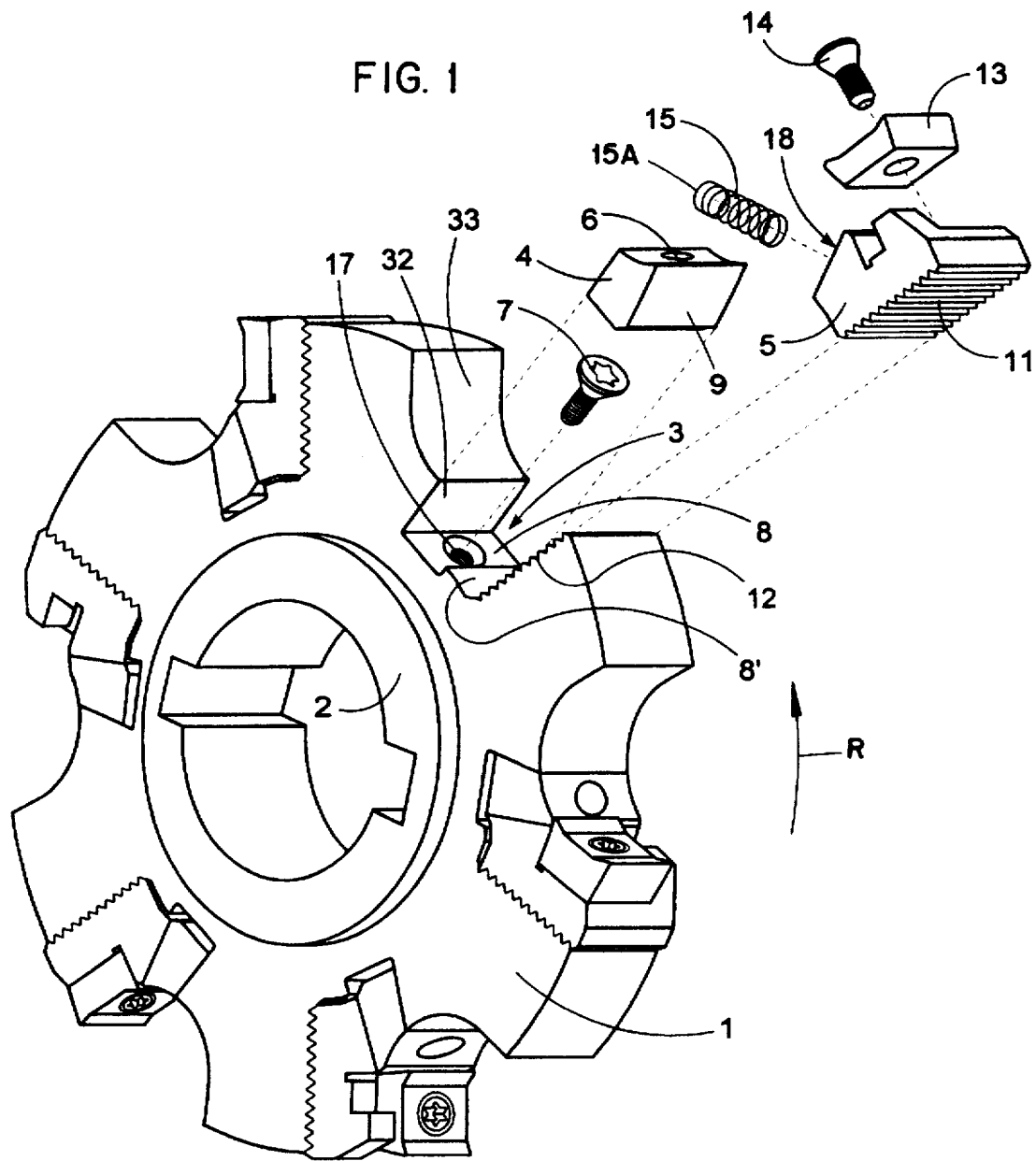
FIG. 1 shows an exploded, perspective view of a side and face milling cutter according to one embodiment of the invention.

In FIG. 1, a disk-shaped milling cutter is generally designated by reference numeral 1. It has a central hub portion 2 for fastening the disk on a driving shaft (not shown) and a plurality of peripheral recesses 3 for the accommodation of clamping wedges 4 and insert-carrying cartridges 5. Each recess comprises a leading wall 32 and a trailing wall 12, with reference to the direction of rotation R. These two walls are substantially parallel with the axis of rotation and converge radially inwards, so that only a minor amount of material need be removed from the milling cutter body to form the recesses. Thus, the recesses become easier to manufacture and to machine, and do not weaken the milling cutter body as much as recesses which diverge radially inwardly. The angle formed by sides 12 and 32 is suitably between 8° and 25°, preferably between 10° and 20°. Moreover, this outwardly diverging angle makes possible the use of larger cartridges 5. Suitably, chip pockets 33 are arranged ahead of each recess 3, in order to obtain an unobstructed and safe chip flow.

Figure 2:
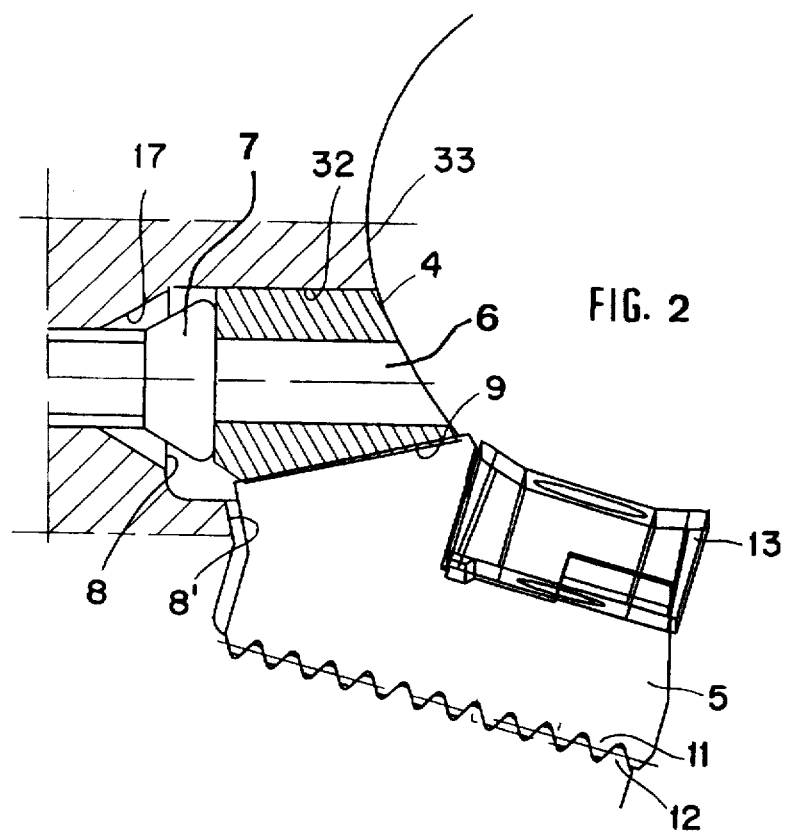
FIG. 2 shows a cutting position in the side and face milling cutter according to FIG. 1, with parts of the disk, the screw and the wedge being shown in a radial cross-section in a clamping state.
Figure 3:
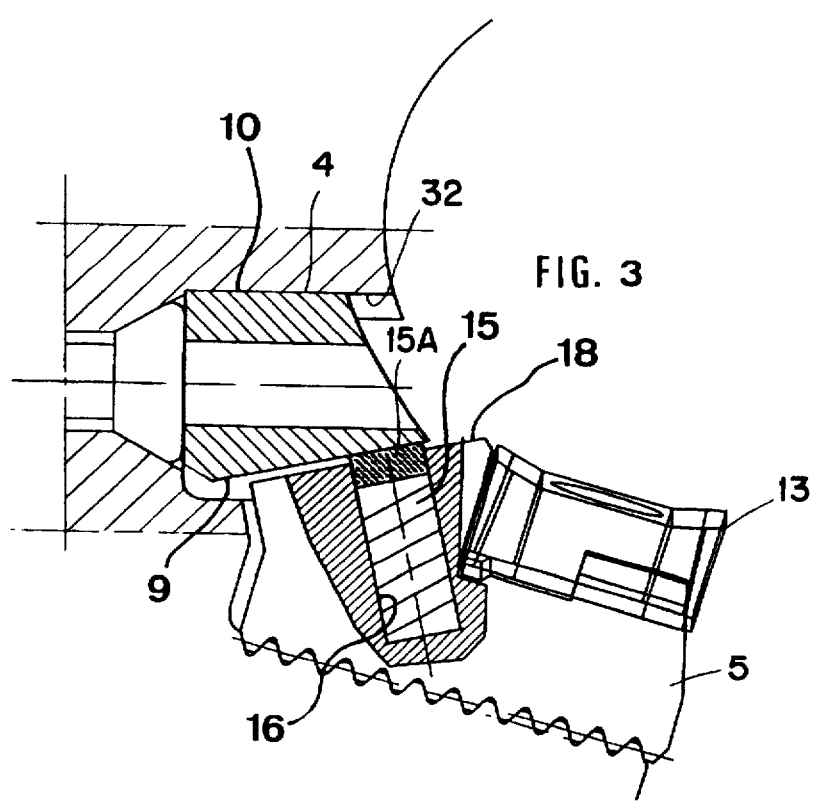
FIG. 3 is similar to FIG. 2 with the wedge in a non-clamping state.

According to the embodiment shown in FIGS. 1–3, each clamping wedge 4 has a smooth hole 6, through which a suitable tightening tool may be introduced, such as a hexagonal key or a torx-key, for the turning of screw 7 that is situated radially inwardly of the wedge. This screw is threaded into a threaded hole 17 provided in the bottom surface 8 of the recess 3. Suitably, the hole 17 is substantially parallel to the side surface 32 of the recess. The bottom surface or support surface 8 can be stepped in order to create an angled bottom surface 8' situated radially inwards of the cartridge 5. However, the surface 8' is not an abutment surface for the cartridge 5; there should always be a radial gap therebetween. The maximum diameter of screw 7 is larger than the diameter of the wedge hole 6, which may be clearly seen in FIGS. 2 and 3. An essential feature of the present invention is that the clamping wedge be "negative", which means that in an axial view it tapers (i.e., narrows) radially outwards, see again FIGS. 2 and 3. Suitably, the angle between the trailing and leading surfaces 9 and 10 of the wedge is between 5° and 25°, preferably between 10° and 20°.

The insert-carrying cartridge 5 has a trailing serrated surface 11, which is substantially axially straight. This serrated surface is intended to engage a corresponding serrated surface 12 of the recess 3. Preferably, the serrations extend the whole width of the face and side milling cutter, but instead they could comprise only a part of this width. Insertion of the cartridge 11 into the recess occurs in an axial direction, either from the front surface of the milling cutter or from its back side, which sides are substantially identical. When the wedge 4 is displaced radially inwards, or even rests upon the bottom surface 8 (in which case the head of the screw 7 would be countersunk into the hole 17), there is created a sufficient gap between the wedge and the cartridge, so that it is possible that the serrations may be disengaged and, thereby, enable a displacement of the cartridge radially outwardly. Further, a suitable cutting insert 13 is mounted in a seat of each cartridge 5 by means of a locking screw 14. These cutting inserts may, for instance, be shaped in accordance with Qvarth U.S. Pat. No. 5,454,671, which is hereby incorporated by reference into the present description.

The mounting of a cartridge is accomplished in that one first tightens the press screw 7 completely or almost completely into the hole 17. Thereafter, the wedge 4 is placed on the support surface 8, or possibly on the head of screw 7, if the latter protrudes from the plane of the support surface 8. Thereafter the cartridge 5 is placed into its position, the intended radial position being attained by selecting the lowermost serration engagement. Since the recess walls 12 and 32 diverge radially outwardly, this serration engagement is the sole means of preventing the cartridge and the wedge from being flung out by centrifugal force. Further, the cartridge, and thereby also the cutting edge, may be finely adjusted axially, by sliding the cartridge in the direction of the serrations before clamping the cartridge. Prior to clamping, i.e., before the wedge is pressed up into its clamping position (FIG. 2), a certain degree of steadiness and stability of the wedge and the cartridge, respectively, is maintained by the fact that a spring 15 disposed in a boring 16 in the cartridge presses a disk 15A against the oblique side surface 9 of the wedge to push the wedge circumferentially against the surface 32. When the cartridge has assumed its desired position, the press screw 7 is rotated and displaced radially outwardly to push the wedge 4 radially outwards, until the latter clamps the cartridge 5 by abutment between surface 9 of the wedge and the leading abutment surface 18 of the cartridge, thereby forcing the serrated surfaces 11 and 12 together.

In comparison to Qvart U.S. Pat. No. 5,395,186, there are two obvious advantages according to this invention: (a) due to the "negative" basic geometry of the wedge 4, the wedge and cartridge become fully centrifugally secured as a unit; and (b) since the wedge hole 6 need not accommodate the press screw 7, but only provide access for a tool for rotating the screw, the hole may be made considerably narrower, which, in turn, makes possible the use of a generally thinner disk 1.

Figure 4:
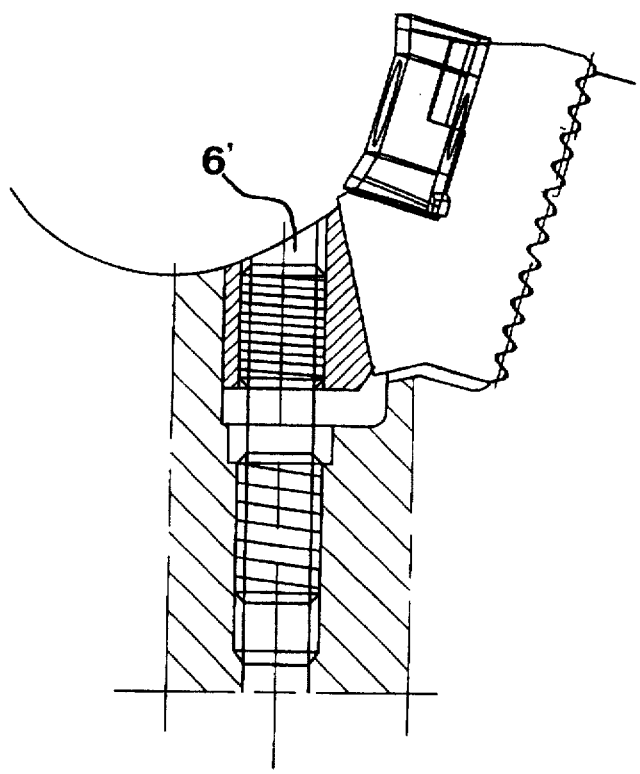
FIG. 4 shows a cutting insert position according to another embodiment of the invention, with the wedge in a clamping state.
Figure 5:
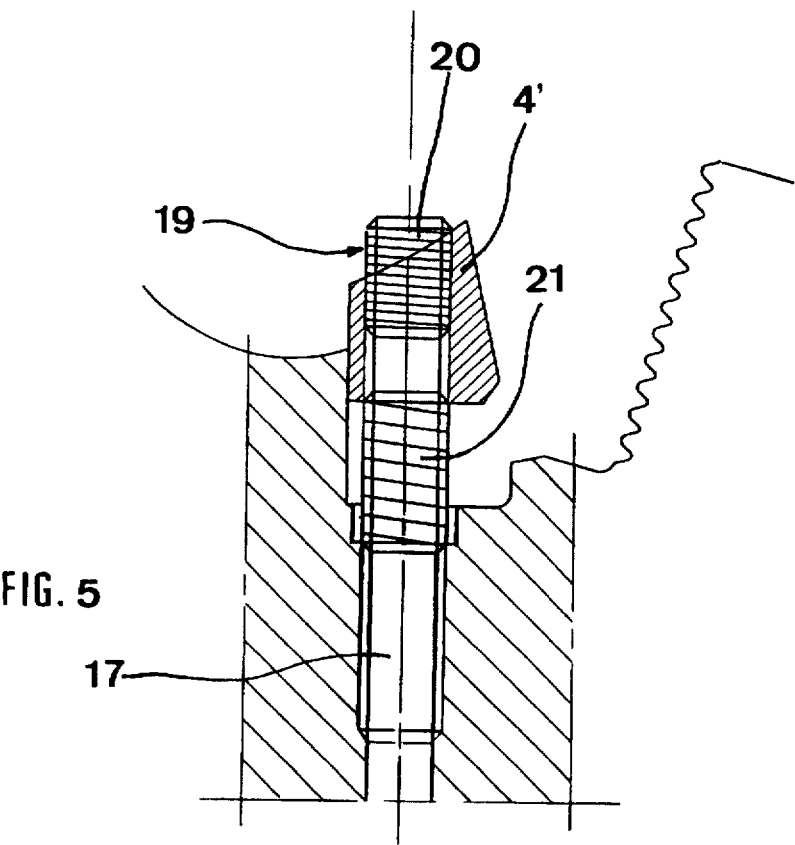
FIG. 5 shows the embodiment of FIG. 4, with the insert-carrying cartridge removed.

In FIGS. 4 and 5 another embodiment of the present invention is shown, which admittedly does not make possible equally thin side and face milling cutters as the embodiment according to FIGS. 1 to 3 (since FIGS. 4 and 5 require a larger hole in the wedge), but which nevertheless has the decisive advantages of full centrifugal reliability, and cutting position recesses which widen radially outwards. According to this embodiment, the wedge 4' is moved radially outwards by turning a double screw 19. This screw comprises two threaded end portions 20 and 21, respectively, which are threaded in the same direction (in the figure a left-hand thread is shown), but with different pitches, e.g., in a ratio of 1:2. When mounting the wedge, the portion 20 of the screw with the smaller pitch is first threaded into the threaded wedge hole 6' until the second threaded portion 21 abuts (FIG. 5). Then the latter portion is threaded counter-clockwise into the disk hole 17, whereby the wedge is displaced radially inwards by a velocity which is half the velocity of the screw. In order to clamp a cartridge according to FIG. 4, the screw is then rotated clockwise.

Figure 6:
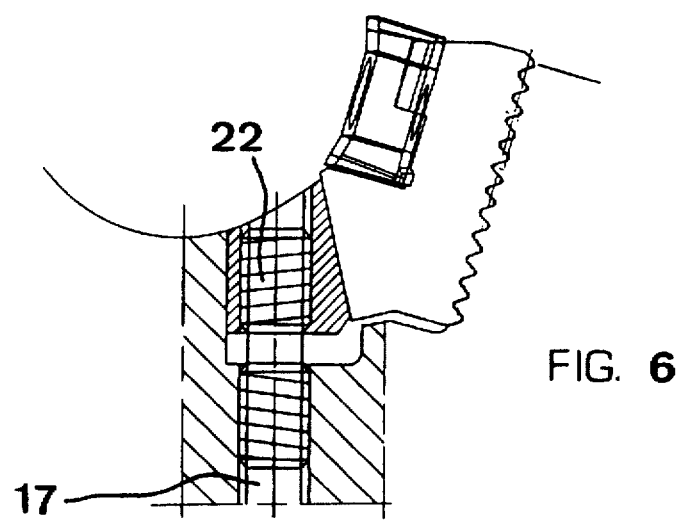
FIG. 6 is similar to FIG. 4 showing another embodiment according to the invention.
Figure 7:
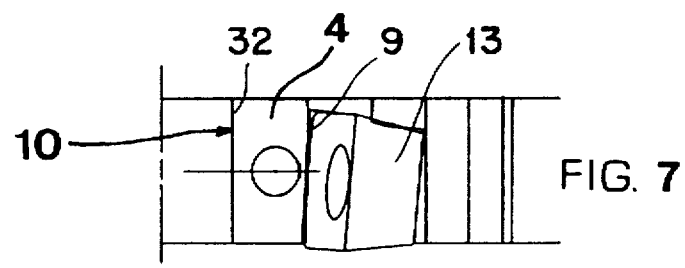
FIGS. 7 to 10 show four different wedge constructions, respectively, as viewed radially from the outside.

Still another embodiment is shown in FIG. 6 wherein a differential screw 22 is used, on which the two opposed, threaded portions are threaded in different directions, i.e., one end is left-hand-threaded and one end is right-hand-threaded. In principle, it is not important which is which. This screw works in a way well known to one skilled in the art. For instance, by rotating the differential screw down a certain distance in the hole 17, the wedge is displaced by twice that distance in the same direction.

Figure 8:
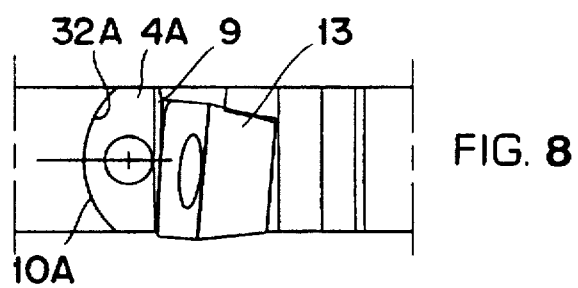
Figure 9:
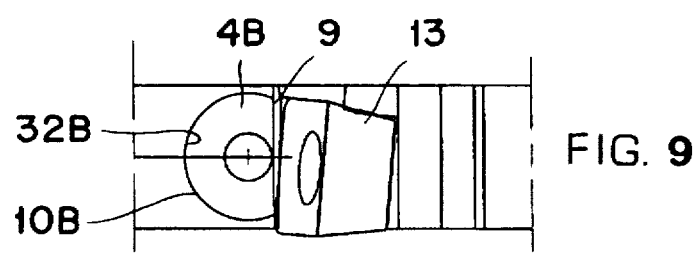
Figure 10:
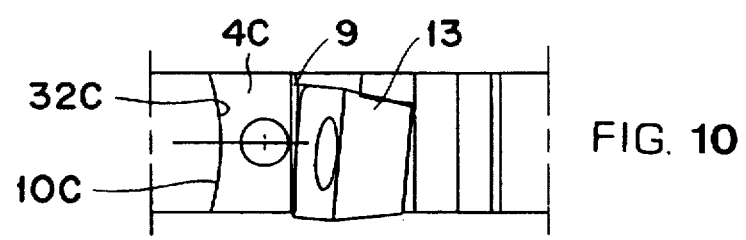

FIGS. 7 to 10 show different embodiments of the wedge 4 seen from radially outside. According to FIG. 7, the wedge has a substantially rectangular cross-section with a flat abutment surface 10 engaging the disc body 1, similar to the embodiment shown in FIG. 1. In order to secure the wedge axially, an alternate wedge configuration has an abutment surface 10A of convex shape engaging a concave surface 32A of the disk body as shown in FIG. 8. In FIG. 9 the wedge has a convex portion 10B engaging a concave surface 32B of the disk body, and a flat surface 9 extending obliquely with respect to the adjacent surface of the cartridge. In FIG. 10 an alternative arrangement is shown wherein the wedge 4C includes a concave engagement surface 10C engaging a convex surface 32C of the disk body.

Figure 11:
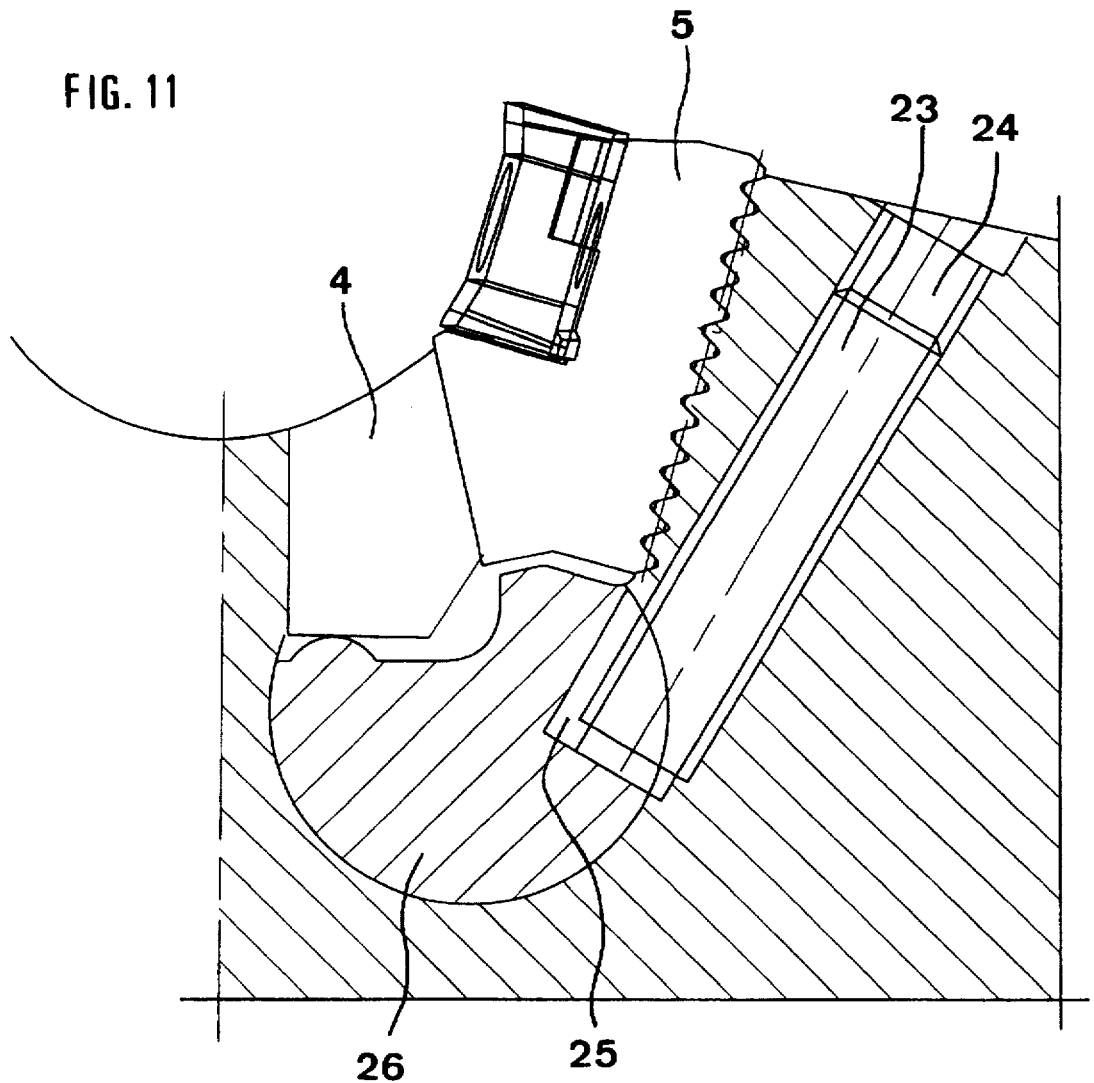
FIG. 11 is similar to FIG. 2 of yet another embodiment of a cutting insert position according to the invention.
Figures 12, 13:
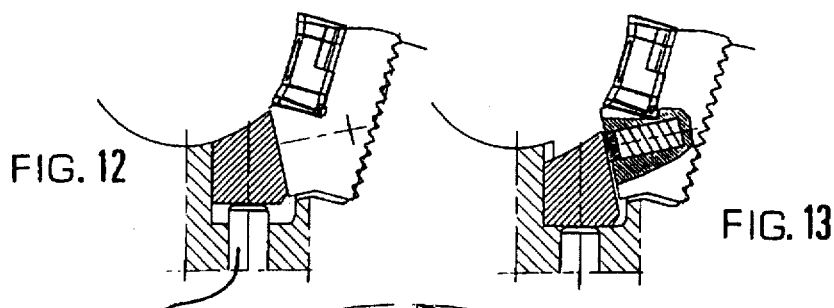
FIG. 12 is a view similar to FIG. 2 of still another embodiment in a clamping state.
FIG. 13 is a view similar to FIG. 12 in a non-clamping state.
Figure 14:
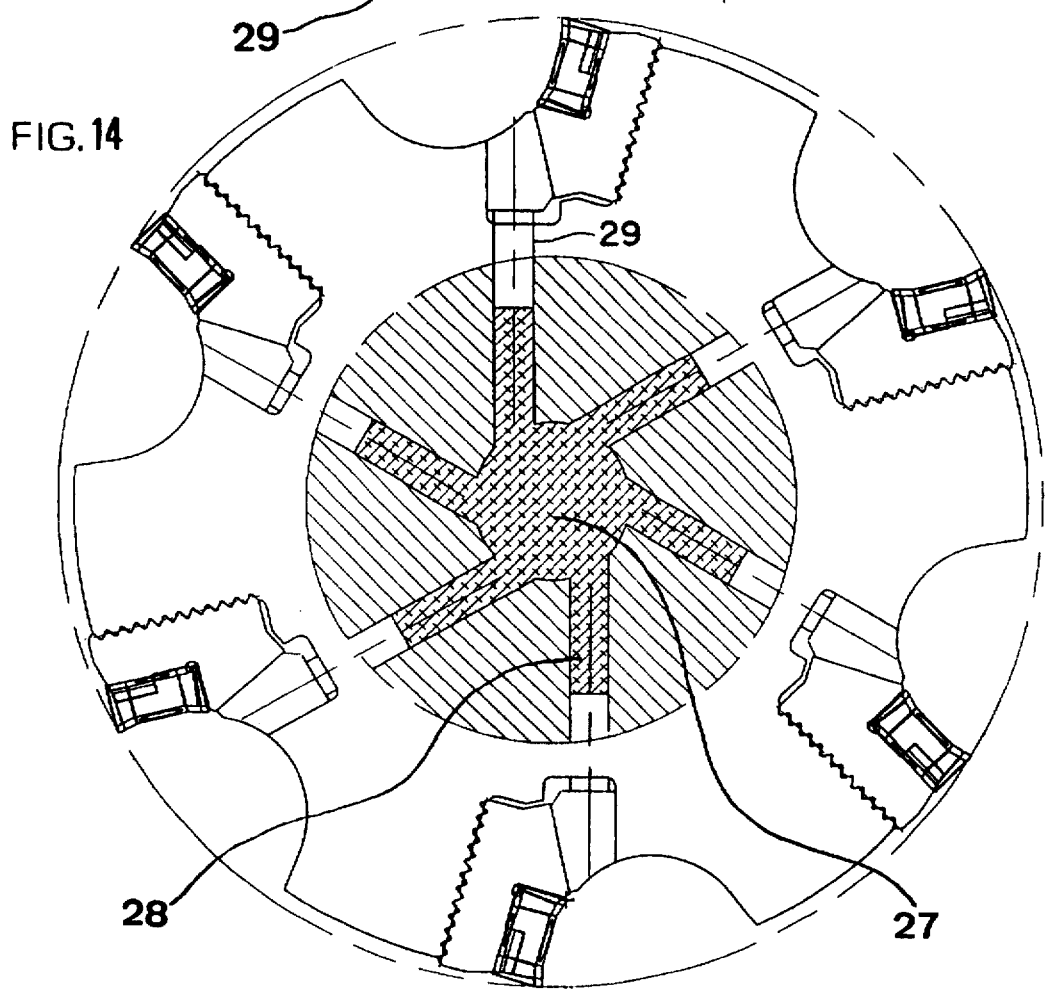
FIG. 14 is a radial sectional view depicting an actuator for the FIG. 12 embodiment.
Figure 15:
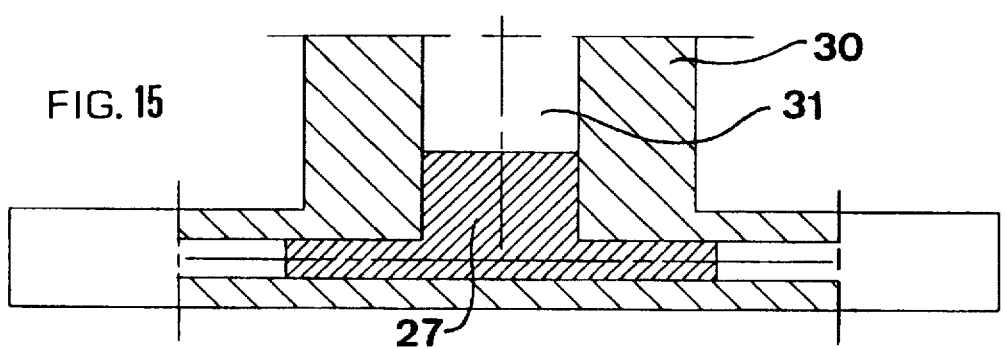
FIG. 15 is a fragmentary axial sectional view of a fluid pressurizer for the FIG. 12 embodiment.

Instead of a press screw 7 according to FIG. 1, other arrangements are also feasible for pressing the wedge 4 radially outwards. Thus, according to FIG. 11 a threaded tap 23 may be threaded into a threaded access passage 24 in the milling cutter disk per se. The radially inner end of this tap is inserted into a cavity 25 in a rotative actuator body 26, whose central axis of revolution is substantially parallel to the axis of rotation of the milling cutter disk. The rotative body 26 transforms a force from the tap that is directed substantially radially inwards, into a force that is directed substantially radially outwards, whereby the force displaces the wedge 4 radially outwards, thus clamping the cartridge.

According to FIGS. 12 to 15, all cartridges in the milling cutter disk may be locked centrally by a hydraulic medium, such as a hydraulic oil, grease or a viscous plastic mass. This medium is enclosed in a sealed space, e.g., in the form of a central actuator cavity 27 and tube-shaped cavities 28 extending substantially radially outwards from said central cavity. Radially outwards, each tube-shaped cavity is terminated by a cylinder-shaped, sealing tap or pin 29 of a suitable hard material, such as steel. In turn, the taps 29 press against the wedges 4 and press these outwards in order to, in an analogous way, clamp the insert-carrying cartridges. The hydraulic medium is pressurized in a suitable way, for instance, by a piston 31 disposed in the shaft 30, or by a pressuring screw (now shown).

For all embodiments, the leading side surface 12 of each recess 3 is suitably substantially parallel to the axial central axis of the wedge-displacing arrangement, independently of whether this is a simple screw 7, a double screw 19 or a tap 29.

The advantages obtained by the present invention should be evident. Due to the negative shape of the clamping wedge, a completely reliable centrifugal security is obtained for both the wedge and the cartridge. Further, the fact that in the embodiments in FIGS. 2–3, 11 and 12–15, the wedge does not have to comprise a threaded hole, but only a tool-access hole, the whole side and face milling cutter may be manufactured with widths down to about 5 mm, which has been impossible with the construction according to Qvart U.S. Pat. No. 5,395,186. While such small widths have been obtained by means of a side and face or slotting milling cutter according to U.S. Pat. No. 4,801,224, that has occurred at the expense of centrifugal security. Further, stable milling cutter bodies have been obtained due to the fact that the recess for the wedge and cartridge is relatively shallow and its walls converge radially inwards. This has turned out to be very essential, in particular for milling cutter bodies with small milling diameters, e.g., less than 100 mm.

What is claimed:

1. A milling cutter tool, comprising:
    a body rotatable about an axis and having circumferentially spaced recesses in its outer periphery, each recess including leading and trailing surfaces with reference to a direction of rotation of said body, said leading and trailing surfaces converging in a radially inward direction, and said trailing surface being serrated;
    cartridges mounted in respective ones of said recesses, each cartridge including a seat adapted to support a replaceable cutting insert, and having leading and trailing surfaces, said trailing surface of said cartridge being serrated and engaging said serrated trailing surface of said recess;
    wedges disposed in respective recesses for clamping said cartridges therein, each wedge including a leading surface engaging said leading surface of said recess, and a trailing surface engaging said leading surface of said cartridge, said leading and trailing surfaces of said wedge being convergent in a radially outward direction; and
    an actuator for forcing each of said wedges radially outwardly into clamping engagement with a respective cartridge.

2. The milling cutter tool according to claim 1, wherein said serrations in said trailing surfaces of said recess and cartridge extend substantially parallel to said axis.

3. The milling cutter tool according to claim 1, wherein each of said recesses includes a bottom wall having a generally radially extending screw-threaded hole, a press screw threadedly secured in said hole and including a head situated radially between said bottom surface and a bottom surface of a respective one of said wedges, said respective wedge including a through-hole aligned with said screw-threaded hole for accommodating a tool for rotating said press screw.

4. The milling cutter tool according to claim 1, wherein each of said recesses includes a bottom wall having a generally radially extending screw-threaded hole, a respective one of said wedges including a screw-threaded through-hole aligned with said hole in said bottom wall, and a head-less screw being threaded into both said hole and said through-hole.

5. The milling cutter tool according to claim 4, wherein said screw includes two threaded portions engaging said hole and through-hole, respectively, said threaded portions being threaded in the same direction and having different pitches.

6. The milling cutter tool according to claim 4, wherein said screw includes two threaded portions engaging said hole and through-hole, respectively, said threaded portions being threaded in opposite directions.

7. The milling cutter tool according to claim 1, wherein said actuator comprises a rotary element disposed radially inwardly of a respective wedge and including a surface engageable with said respective wedge for displacing said wedge radially outwardly in response to rotation of said element in one direction, and means for rotating said element.

8. The milling cutter tool according to claim 7, wherein said body includes access passages communicating with respective ones of said rotary elements for enabling a force to be transmitted to said element for rotating said element.

9. The milling cutter tool according to claim 8, further including a screw-threaded tap threaded into said access passage for generating said force.

10. The milling cutter tool according to claim 1, wherein said actuator includes a fluid passage arrangement disposed within said body and containing fluid, means for pressurizing the fluid in said fluid passage arrangement, and means for transmitting a force of the pressurized fluid to said wedges.

11. The milling cutter tool according to claim 1, further including members spring biased against the respective wedges to push said respective wedges.

12. The milling cutter tool according to claim 11, wherein said members are disposed in respective cartridges and are arranged to push said respective wedges circumferentially against said leading surface of said recesses.

13. The milling cutter tool according to claim 1, wherein said leading surfaces of said wedges are concave, and said leading surfaces of said recesses are convex.

14. The milling cutter tool according to claim 1, wherein said leading surfaces of said wedges are convex, and said leading surfaces of said recesses are concave.

* * * * *